US012656553B2

(12) United States Patent
Dorche et al.

(10) Patent No.: US 12,656,553 B2
(45) Date of Patent: Jun. 16, 2026

(54) HETEROGENEOUSLY INTEGRATED PHOTONIC PLATFORM SUPPORTING LARGE EFFECTIVE MODE AREA WAVEGUIDES AND THERMALLY OPTIMIZED ACTIVE COMPONENTS

(71) Applicants: Ali Eshaghian Dorche, Goleta, CA (US); Minh Tran, Goleta, CA (US); Tin Komljenovic, Goleta, CA (US)

(72) Inventors: Ali Eshaghian Dorche, Goleta, CA (US); Minh Tran, Goleta, CA (US); Tin Komljenovic, Goleta, CA (US)

(73) Assignee: Nexus Photonics Inc, Goleta, CA (US)

( * ) Notice: Subject to any disclaimer, the term of this patent is extended or adjusted under 35 U.S.C. 154(b) by 316 days.

(21) Appl. No.: 18/226,667

(22) Filed: Jul. 26, 2023

(65) Prior Publication Data

US 2025/0035849 A1 Jan. 30, 2025

(51) Int. Cl.
*G02B 6/27* (2006.01)
*G02F 1/01* (2006.01)

(52) U.S. Cl.
CPC .......... *G02B 6/2766* (2013.01); *G02B 6/2726* (2013.01); *G02F 1/0102* (2013.01); *G02F 1/0113* (2021.01); *G02F 2203/21* (2013.01)

(58) Field of Classification Search
CPC ... G02B 6/2766; G02B 6/2726; G02F 1/0113; G02F 1/0102; G02F 2203/21
See application file for complete search history.

(56) References Cited

U.S. PATENT DOCUMENTS

| | | | | |
|---|---|---|---|---|
| 11,107,497 B1 * | 8/2021 | Yang | ..................... | G11B 7/1362 |
| 2002/0154848 A1 * | 10/2002 | Shimonaka | ............. | G02B 6/122 |
| | | | | 385/14 |
| 2011/0229070 A1 * | 9/2011 | Doi | ......................... | G02F 1/225 |
| | | | | 385/3 |
| 2013/0301985 A1 * | 11/2013 | Achouche | ................ | G02B 6/26 |
| | | | | 385/39 |
| 2020/0233149 A1 * | 7/2020 | Park | ......................... | G02B 6/13 |
| 2020/0313397 A1 * | 10/2020 | Jung | ..................... | H01S 5/3406 |
| 2021/0063659 A1 * | 3/2021 | Nakamura | .............. | H01S 5/026 |
| 2023/0152008 A1 * | 5/2023 | Brewer | .................. | F24S 50/40 |
| | | | | 126/569 |

* cited by examiner

*Primary Examiner* — Thomas A Hollweg
*Assistant Examiner* — Marc E Manheim
(74) *Attorney, Agent, or Firm* — Shalini Venkatesh

(57) ABSTRACT

An optical device has five elements fabricated on one substrate. The first has an active waveguide structure supporting a first mode. The second has a passive waveguide supporting a second mode. The third has a passive waveguide supporting a third mode. The fourth element has a heatsink thermally coupled to the first element. The fifth element, at least partly butt-coupled to the first element, has an intermediate waveguide supporting an intermediate mode.

The effective mode area of the third mode is larger than that of the second mode;

A tapered waveguide structure in the second or fifth element facilitates efficient adiabatic transformation between the second mode and the intermediate mode.

A tapered waveguide structure in at least one of the second and third elements facilitates efficient adiabatic transformation between the second mode and the third mode.

No adiabatic transformation occurs between the intermediate mode and the first mode.

15 Claims, 9 Drawing Sheets

200

Cut A-1

251 252 253 254
201 203 202-2 204-3
208
230
204-2
202-1
204-1
205

Active region    Transition region    Large mode region z
x

Cut A-1

Cut A-2

300

304-2

304-3

354

302

353

303

352

351

301

308

304-2

330

304-1

305

Large mode region

Transition region

Active region z x

800

HETEROGENEOUSLY INTEGRATED PHOTONIC PLATFORM SUPPORTING LARGE EFFECTIVE MODE AREA WAVEGUIDES AND THERMALLY OPTIMIZED ACTIVE COMPONENTS

FIELD OF THE INVENTION

The present invention relates to photonic integrated circuits. More specifically, certain embodiments of the invention relate to improved performance of heterogeneously integrated active components with large effective mode area waveguides using dissimilar materials that are optically coupled.

BACKGROUND OF THE INVENTION

A photonic integrated circuit (PIC) or integrated optical circuit is a device that integrates multiple photonic functions and as such is analogous to an electronic integrated circuit. The major difference between the two is that a photonic integrated circuit provides functions for information signals imposed on optical carrier waves.

The material platform most commercially utilized for photonic integrated circuits is indium-phosphide (InP), which allows for the integration of various optically active and passive functions on the same chip. Although many current PICs are realized in InP platforms, there has been significant research in the past decade in using silicon (Si) and silicon-nitride (SiN) rather than InP for the realization of PICs, due to some superior characteristics as well as superior processing capabilities for the former material, that leverage the investment already made for electronic integrated circuits.

The biggest drawback in using Si for PICs is that it is an indirect bandgap material which makes it hard to provide electrically pumped sources. This problem is generally solved by assembling PICs comprising two or more chips made from dissimilar materials in separate processes. Such an approach is challenging due to a need for very fine alignment, which increases packaging costs and introduces scaling limitations. Another approach to solving the bandgap problem is to bond two dissimilar materials and process them together, removing the need for precise alignment during the bonding of larger pieces or complete wafers of the dissimilar materials, and allowing for mass fabrication. In this disclosure, we use the term "hybrid" to describe the first approach that includes precise assembly of separately processed parts, and we use the term "heterogeneous" to describe the latter approach of bonding two materials and then processing the bonded result to define the waveguides and other components of interest.

To transfer the optical signal between dissimilar materials, the heterogeneous approach traditionally utilizes tapers whose dimensions are gradually reduced until the effective mode refractive indexes of dissimilar materials match and there is efficient power transfer. This approach generally works well when materials have small differences in refractive indexes as is the case with Si and InP. In cases where there is a larger difference in effective indexes, such as between e.g., SiN and gallium-arsenide (GaAs) or InP, the requirements on taper tip dimensions become prohibitive limiting efficient power transfer. Specifically, extremely small taper tip widths (of the order of tens of nanometers) may be necessary to provide good coupling. Achieving such dimensions is complex and may be cost prohibitive.

Although InP and Si-based PICs address many current needs, they have some limitations; among them the fact that the operating wavelength range is limited by material absorption increasing the losses, the fact that there is a limit on the maximum optical intensities and consequently optical powers that a PIC can handle, the fact that they typically exhibit higher propagation losses (e.g. Si vs SiN waveguides), and the fact that they typically have higher coupling losses to optical fibers due to smaller mode size (higher refractive index contrast between the core and the cladding).

To address these limitations, alternative waveguide materials have been considered, such as SiN, silicon-oxynitride (SiONx), lithium-niobate (LiNbO$_3$), titanium dioxide (TiO$_2$), tantalum pentoxide (Ta$_2$O$_5$), aluminum-nitride (AlN) or others. In general, such dielectric waveguides have higher bandgap energies which provides better high-power handling and transparency at shorter wavelengths, but, in general such materials also have lower refractive indexes. E.g. SiN with bandgap of ~5 eV has refractive index of ~2, AlN has bandgap of ~6 eV and refractive index of around ~2, and SiO$_2$ with bandgap of ~8.9 eV has refractive index of ~1.44. Due to lower refractive index contrast of such waveguides, they support larger optical mode sizes and typically provide lower propagation loss and superior coupling efficiency to optical fiber. At the same time, the large difference in refractive index between the waveguide material and InP/GaAs makes the tapered approach to couple light on-chip between the waveguide and InP/GaAs challenging. For comparison, the refractive index of both InP and GaAs is >3. The alternative hybrid approach suffers from the drawbacks already mentioned above, namely the need for precise alignment, and correspondingly complex packaging and scaling limitations.

A recent approach to the problems discussed above was presented in U.S. Pat. No. 10,859,764 B2 employing butt-coupling in combination with a mode-converter to allow the heterogenous process to be used without the need for extremely small taper widths. The use of butt-coupling significantly relaxes the requirements on taper widths but might have challenges when combined with waveguides supporting large effective mode areas. To support large optical mode size on a PIC, typically thicker dielectric cladding is needed which can negatively impact the performance of high-power active devices due to less efficient heat dissipation.

The present invention is directed towards heterogeneous components and PICs employing butt-coupling but with optimized thermal performance of the active components that are efficiently optically coupled to large effective mode area waveguides. In particular, embodiments described below are concerned with the detailed design of photonic platforms necessary for the creation of high-performance heterogeneously integrated lasers and actives coupled to large effective mode area waveguides.

DETAILED DESCRIPTION

Figure 1:
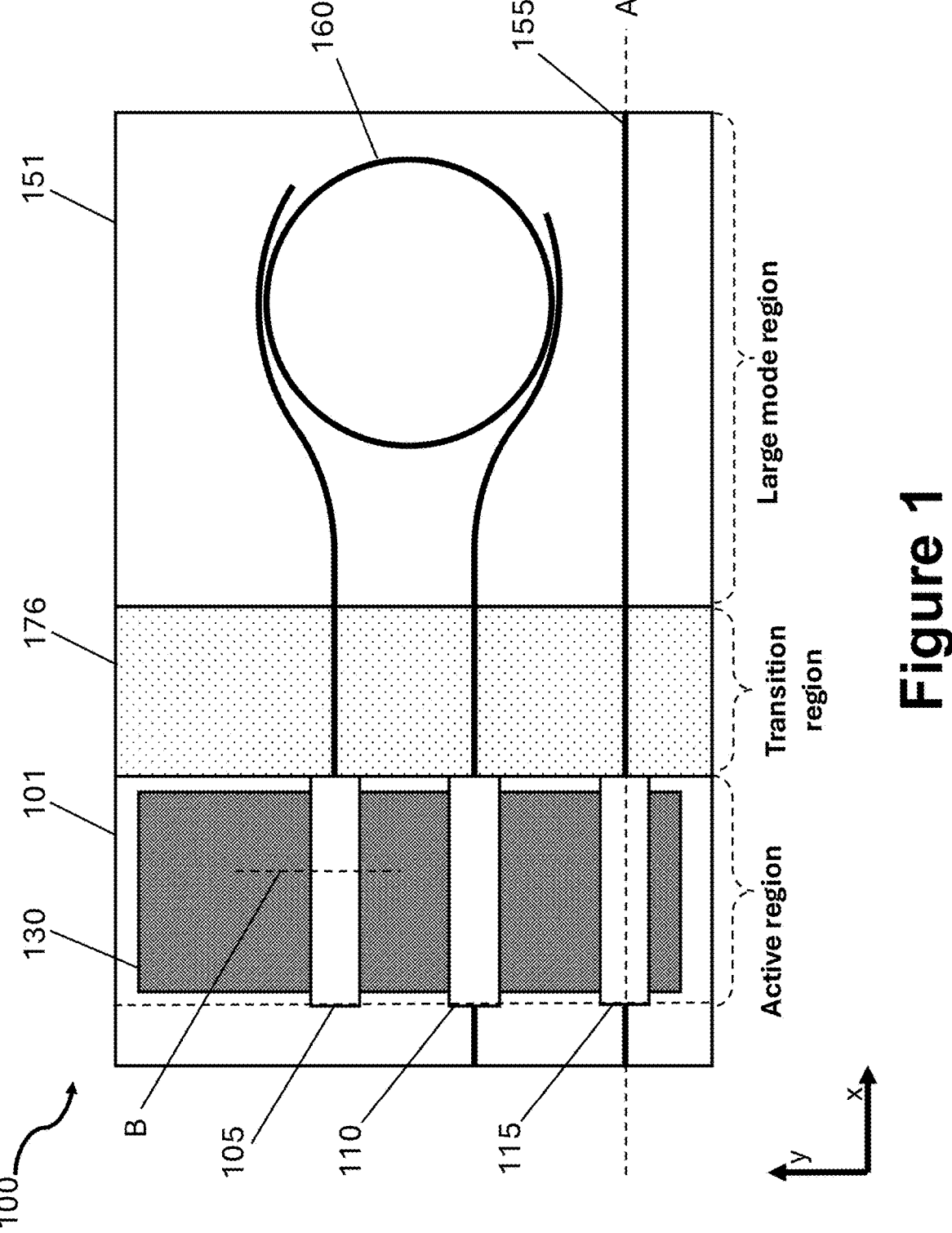
FIG. 1 illustrates a device according to one embodiment of the present invention, shown in top-down cross section.

Described herein are embodiments of a platform for realization of photonic integrated circuits using wafer bonding and deposition of dissimilar materials where optical coupling is improved by the use of mode conversion and a butt-coupling scheme. More specifically, certain embodiments of the invention relate to improved thermal performance of heterogeneously integrated lasers and active components when integrated with waveguides supporting large effective mode areas.

In the following detailed description, reference is made to the accompanying drawings which form a part hereof, wherein like numerals designate like parts throughout, and in which are shown by way of illustration embodiments in which the subject matter of the present disclosure may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

The description may use perspective-based descriptions such as top/bottom, in/out, over/under, and the like. Such descriptions are merely used to facilitate the discussion and are not intended to restrict the application of embodiments described herein to any particular orientation. The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The term "coupled with," along with its derivatives, may be used herein. "Coupled" may mean one or more of the following. "Coupled" may mean that two or more elements are in direct physical, electrical, or optical contact. However, "coupled" may also mean that two or more elements indirectly contact each other, but yet still cooperate or interact with each other, and may mean that one or more other elements are coupled or connected between the elements that are said to be coupled with each other. The term "directly coupled" means that two or more elements are in direct contact in at least part of their surfaces. The term "butt-coupled" is used herein in its normal sense of meaning an "end-on" or axial coupling, where there is minimal or zero axial offset between the elements in question. The axial offset may be, for example, slightly greater than zero in cases where a thin intervening layer of some sort is formed between the elements, such as thin coating layer typically used to provide high-reflectivity or anti-reflectivity function- ality. It should be noted that the axes of two waveguide structures or elements need not be colinear for them to be accurately described as being butt-coupled. In other words, the interface between the elements need not be perpendicu- lar to either axis in the case of e.g. angled interface. Angled interfaces can be used, as an example, to control the back reflection. No adiabatic transformation occurs between butt- coupled structures.

Term "active device," "active structure" or otherwise "active" element, part, component may be used herein. A device or a part of a device called active is capable of light generation, amplification, modulation and/or detection using electrical contacts. This is in contrast to what we mean by a "passive device" whose principal function is to confine and guide light, and/or provide splitting, combining, filtering and/or other functionalities that are commonly associated with passive devices. Some passive devices can provide functions overlapping with active device functionality, such as phase tuning implemented using thermal effects or similar that can provide modulation. No absolute distinction should be assumed between "active" and "passive" based purely on material composition or device structure. A silicon device, for example, may be considered active under certain con- ditions of modulation, or detection of low wavelength radia- tion, but passive in most other situations.

FIG. 1 depicts a top-down view (100) of a photonic integrated circuit (PIC) device according to one embodiment of the present invention, in which three distinct active elements 105, 110, and 115 are present. In other embodi- ments, there may be a smaller or greater number of active elements. In all cases, the PIC comprises three distinct regions as illustrated: an active region, a transition region and a large (effective) mode area region.

In the particular illustrated case, active element 105 may be a laser or photodetector, while active elements 110 and 115 may be semiconductor optical amplifiers or modulators, but many variations and combinations may be envisaged. In the illustrated embodiment, all of the active elements are positioned on top of a heatsink 130, with or without a spacer layer as will be described with the help of FIGS. 2-4. In other cases, not shown, the heatsink may be thermally coupled to fewer than all the active elements on the PIC but at least to one. The heatsink, in some embodiments, is characterized by a thermal conductivity >10 W/mK. In some embodiments, materials used to make the heatsink include, but are not limited to, one or more of silicon, silicon-nitride, copper, gold, aluminum, tungsten, silver, zinc, diamond, graphite, silicon-carbide, and aluminum-nitride. The main purpose of the heatsink 130 is to efficiently conduct the heat generated by an active element away from that element, as it would have a thermal conductivity that is larger than the conduc- tivity of typical dielectrics used to provide optical claddings. As an illustration, the thermal conductivity of silicon-diox- ide ($SiO_2$) is only ~1.3 W/mK.

The active elements are efficiently optically coupled to large mode area region 151 using the transition region 176 as will be described in more detail with the help of FIGS. 2 and 3.

In some embodiments, lasers (such as element 105 in FIG. 1) are injection-locked to high quality factor resonators made in large mode regions (such as element 160 in FIG. 1). Quality factors >100 million have been realized using large mode area waveguides, and such resonators can reduce laser linewidth by one or more orders of magnitude. Furthermore, if such resonators are implemented in a so-called add/drop configuration (as also shown in FIG. 1), they can signifi- cantly reduce the impact of reflections on laser performance. The output of such an injection locked laser can be further amplified with a semiconductor optical amplifier (such as e.g., element 110). The thermal performance of both lasers and amplifiers is improved by using heatsink 130 as will be explained below. In other embodiments, an active device (such as e.g., element 115) may simply be efficiently coupled to a large mode area waveguide and guided to facet 155, to deliver an output with a relatively high-quality beam profile and a large effective area to an optical fiber or another large mode area device.

In all cases, the size of the heatsink 130 can be significantly larger than the size of the active element. Benefits of such arrangements are illustrated with the help of FIG. 8.

Figure 2:
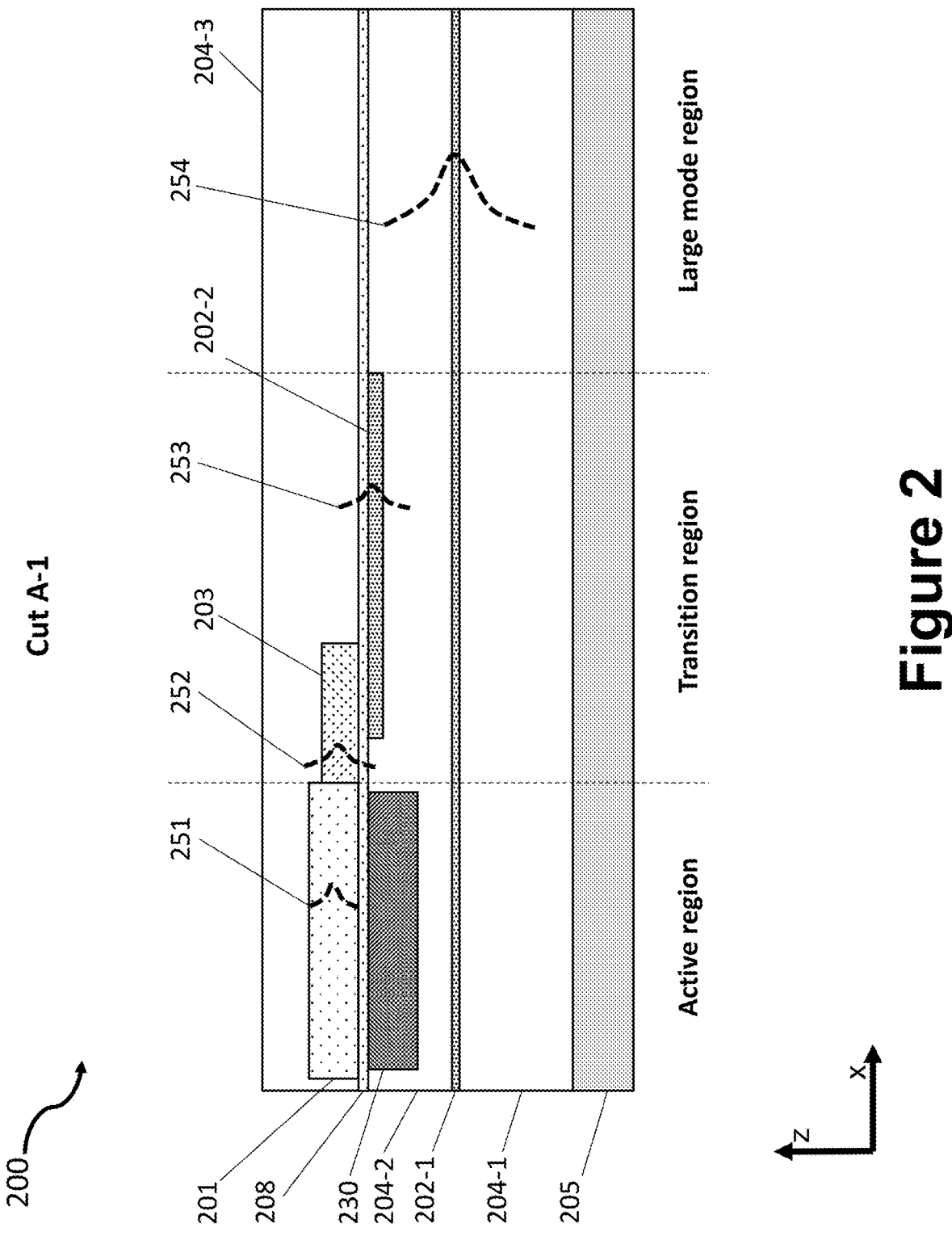
FIG. 2 shows a cross-sectional view of a device according to some embodiments of the present invention.
Figure 3:
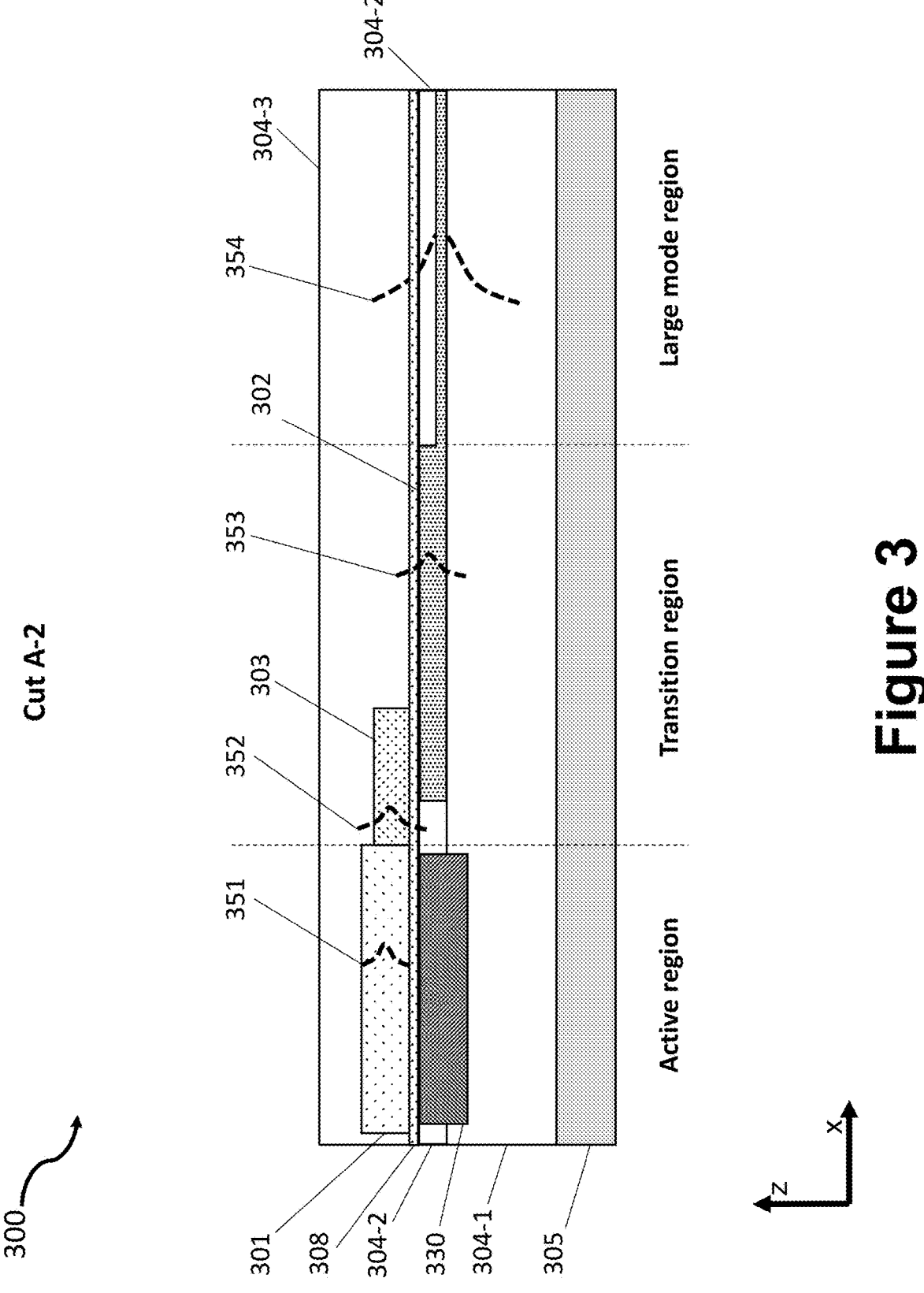
FIG. 3 shows a cross-sectional view of a device according to some embodiments of the present invention.

The dashed line labelled A in FIG. 1 corresponds to one characteristic cross-section location, to be described in more detail with the help of FIGS. 2 and 3. The dashed line labelled B corresponds to yet another characteristic cross-section location, to be described in more detail with the help of FIG. 4.

FIG. 2 is a schematic cross-section view of an embodiment of an integrated photonic device 200 utilizing butt-coupling for efficient coupling between dissimilar materials. This cross-section labelled Cut A-1 corresponds to one embodiment of a device at the location marked by the dashed line labelled A in FIG. 1 Three distinct regions are indicated, as the active region, the transition region and the large mode region.

The illustrative cross-section includes a substrate 205 that can be any suitable substrate for semiconductor and dielectric processing, such as Si, InP, GaAs, quartz, sapphire, glass, gallium-nitride (GaN), silicon-on-insulator (SOI) or other materials known in the art. In the shown embodiment, a layer of material 204-1 is deposited, grown, transferred, bonded, or otherwise attached to the top surface of substrate 205 using techniques known in the field. The main purpose of layer 204-1 is to provide optical cladding for material 202-1 (to be described below), if necessary to form an optical waveguide. Optical waveguides are commonly realized by placing a higher refractive index core between two lower refractive index layers serving as cladding to confine the optical wave. In some embodiments, layer 204-1 is silicon-dioxide (SiO$_2$). In yet other embodiments, layer 204-1 is omitted and substrate 205 itself serves as a cladding.

Layer 202-1 is deposited, grown, transferred, bonded, or otherwise attached to the top of layer 204-1 if present, and/or to the top of substrate 205 if there is no layer 204-1, using techniques known in the field. The refractive index of layer 202-1 is higher than the refractive index of layer 204-1 if present, or, if layer 204-1 is not present, the refractive index of layer 202-1 is higher than the refractive index of substrate 205, in either case to act as a waveguide core for optical mode 254. In one embodiment, the material of layer 202-1 may include, but is not limited to, one or more of SiN, silicon-oxynitride (SiONx), titanium-dioxide (TiO$_2$), tantalum-pentoxide (Ta$_2$O$_5$), (doped) SiO$_2$, lithium-niobate (LiNbO$_3$), alumina (Al$_2$O$_3$) and aluminum-nitride (AlN). Either or both layers 204-1 and 202-1 can be patterned, etched, or redeposited to tailor their functionality (by defining waveguides, splitters, couplers, gratings, and other passive components) as is common in the art.

A layer of material 204-2 is deposited, grown, transferred, bonded, or otherwise attached to the top surface of layer 202-1 using techniques known in the field. The main purpose of layer 204-2 is to provide optical cladding for both material 202-1 and material 202-2 (to be described below) to form an optical waveguide.

Layer 202-2 is deposited, grown, transferred, bonded, or otherwise attached to the top of layer 204-2 using techniques known in the field. The refractive index of layer 202-2 is higher than the refractive index of layer 204-2, to provide a waveguide core for mode 253. In one embodiment, the material of layer 202-2 may include, but is not limited to, one or more of SiN, SiONx, TiO$_2$, Ta$_2$O$_5$, (doped) SiO$_2$, LiNbO$_3$, Al$_2$O$_3$ and AlN. Either or both layers 204-2 and 202-2 can be patterned, etched, or redeposited to tailor their functionality (by defining splitters, couplers, gratings, and other passive waveguide components) as is common in art.

Heatsink layer 230, corresponding to 130 in FIG. 1, is deposited on a suitable prepared etched pocket inside layer 204-2 (as shown in FIG. 2), In some cases, not shown, a portion of layer 202-2 may be present underlying 201 (described below), and the pocket may extend into that portion. In yet other embodiments, the etched pocket can be deep enough to extend through layer 202-1 into 204-1, may even reach layer 205. Calculations show that the impact of the thickness of layer 230 (corresponding to the etched pocket depth) saturates, as will be explained with the help of FIG. 6, such that even relatively small thicknesses in the order of 100 nm can significantly improve the active device thermal related performance.

Optional layer 208, whose refractive index is lower than the refractive index of layer 202-2, overlays layer 202-2 and/or 230, underlays layers 201 and 203 (to be described below) and serves as a spacer layer. In cases where layer 208 is present on top of layer 202-2 and/or 230, the target thickness of 208 is typically in the range of 10 nm to several hundreds of nm, with actual thickness, due to process non-uniformities, being between zero and several hundreds of nanometers larger than the target thickness. In some other embodiments the thickness of 208 can be larger and approach 1000 nm, or layer 208 might be absent. In some embodiments, layer 208 is SiO$_2$.

In cases where layer 208 is not present, not shown, layer 201 is bonded onto at least part of the top surface of one or more of layers 204-2, 230, and 202-2. In the shown embodiment, 201 is bonded to the top surface of layer 208. The bonding can be direct molecular bonding, or additional materials can be used to facilitate bonding such as e.g. metal layers or polymer films as is known in the art. Layer 201 is patterned to form what is commonly called an active device (such as 105, 110 or 115. in FIG. 1), and may be made up of materials including, but not limited to, InP and InP-based ternary and quaternary materials, GaAs and GaAs based ternary and quaternary materials, GaN and GaN based ternary and quaternary materials, GaP, InAs and InSb and their variations and derivatives or any other suitable material for providing direct optical emission, amplification, modulation and/or detection. Layer 201 in some embodiments is multilayered, comprising sublayers providing both optical and electrical confinement as well as electrical contacts, as is known in the art for active devices. Sublayers of layer 201 in some embodiments provide vertical confinement (up/down in FIG. 2, z-axis), while lateral confinement (surface normal to the cross-section shown in FIG. 2, y-axis which is not visible in this cross-section) is provided by at least one etch as is known in the art for active devices and will be described with the help of FIG. 4.

In some embodiments, layer 201 can be efficiently electrically pumped to generate optical emission and gain. In other embodiments, layer 201 can provide modulation and/or detection. The present invention enables efficient optical coupling between waveguides formed in layer 201 and layers 202-2 and 202-1. Said materials 202-1 and 202-2 can provide additional functionality such as wide-band transparency, large effective mode area (layer 202-1), low propagation loss, high intensity handling, phase shifting by temperature, strain or other tuning mechanisms, combining, splitting, filtering, non-linear generation and/or others as is known in the art.

Efficient coupling is facilitated by layer 203. Layer 203 serves as an intermediate waveguide that in some embodiments accepts the profile (depicted by line 251) of an optical mode supported by the waveguide for which layer 201 provides the core, captures it efficiently as mode profile 252, and gradually transfers it to mode profile 253 for which layer 202-2 provide the core, and finally gradually transfers it to mode profile 254 for which layer 202-1 provides the core. Mode profile 254 has a larger effective mode area (as commonly defined in relation to non-linear effects) than that of mode profile 253. In some embodiments this condition of large effective mode area may be defined as corresponding to an effective mode area that is larger than $M*\lambda^2$, where $\lambda$ is the wavelength of operation and M is a numerical coefficient, whose value may be selected according to the application, but is always greater than or equal to 1. In some embodiments, for example, M may be 10, meaning that the condition of large effective mode area would be a mode effective area that is larger than $10*\lambda^2$.

The refractive index and dimensions characterizing layer 203 can be engineered to support optimized mode 252 that facilitates efficient butt-coupling of mode profile 251, and also to efficiently transform that mode to one with mode profile 254 by taking advantage of tapered structures made in layer 202-1, 202-2 and/or layer 203. The transition between modes 252, 253 and/or 254 utilizes evanescent and/or adiabatic coupling, using techniques well known in the art. In some embodiments, the refractive index of layer 203 is smaller than the refractive index of layer 202-2. In some embodiments the refractive index of layer 203 is between 1.44 and 1.9. The thickness of layer 203 is an optimization parameter, and in some embodiments, it is between 400 nm and 4000 nm, thickness largely being dependent on details of the layer 201 and size of the mode 251.

The upper cladding layer 204-3 for waveguides realized in 203 and/or 202-2 can be ambient air (meaning no cladding material is actually deposited) or can be any deliberately deposited suitable material as shown in FIG. 2, including, but not limited to, a polymer, $SiO_2$, SiN, SiONx etc. In some embodiments, the same material is used for layer 204-3 and layer 208. In some embodiments (not shown), layer 204-3 cladding functionality can be provided with multiple depositions, e.g., one material provides the cladding for mode 253 guided by core formed in layer 202-2, and another material provides the cladding for mode 252 guided by core formed in layer 203. In all cases, the refractive index of the cladding material is lower than the refractive index of the material which provides the core for the mode guiding. In yet another embodiment (not shown), layer 203 can provide, at least partially, cladding functionality to layer 202-2 and mode 253 as refractive index of 203 is smaller than the refractive index of layer 202-2.

The embodiment shown in FIG. 2 supports large effective area modes in the large mode region as indicated by mode 254 by supporting thick dielectric claddings 204-1, 204-2 and/or 204-3. It also provides efficient heatsinking of the active devices 201, and low-coupling losses between modes 251 and 254. In some embodiments, the thickness (z-direction) of cladding 204-1 is greater than 2 μm. Providing a relatively thick upper cladding for the waveguide core 202-1 in the large mode region may additionally provide low-propagation losses and a useful degree of mechanical protection to that core in some embodiments.

FIG. 3 is a schematic cross-section view of another embodiment of an integrated photonic device 300 utilizing butt-coupling for efficient coupling between dissimilar materials. This cross-section labelled Cut A-2 corresponds to another embodiment of a device at the location marked by the dashed line A in FIG. 1 where three distinct regions are indicated as the active region, transition region and large mode region. Functional layers 301 to 330 (unless explicitly defined differently) correspond to functional layers 201 to 230 as described in relation to FIG. 2.

In contrast to the embodiment shown in FIG. 2, the embodiment shown in FIG. 3 does not have two distinct waveguide core layers analogous to 202-1 and 202-2 that are separated vertically by a cladding layer analogous to 204-2. Instead of two elements corresponding to 202-1 and 202-2, a single waveguide core element 302 is present, with a partial etched taper to adjust thickness along the x-axis, affecting the transition between mode 353 supported by the thicker portion of 302 and 354, supported by the thinner portion. The optional etch stop layer can provide improved process control of the etch depth, and correspondingly the reduced thickness (z-direction) of the element 302 in the large mode region. Cladding layer 304-2 overlies 302 in the large mode region. Transition between modes 351, 352 and 353 follows the same flow described above for modes 251, 252 and 253 in relation to FIG. 2. The transition between modes 353 and 354 utilizes a taper made in the shallow etch of layer 302.

Figure 4:
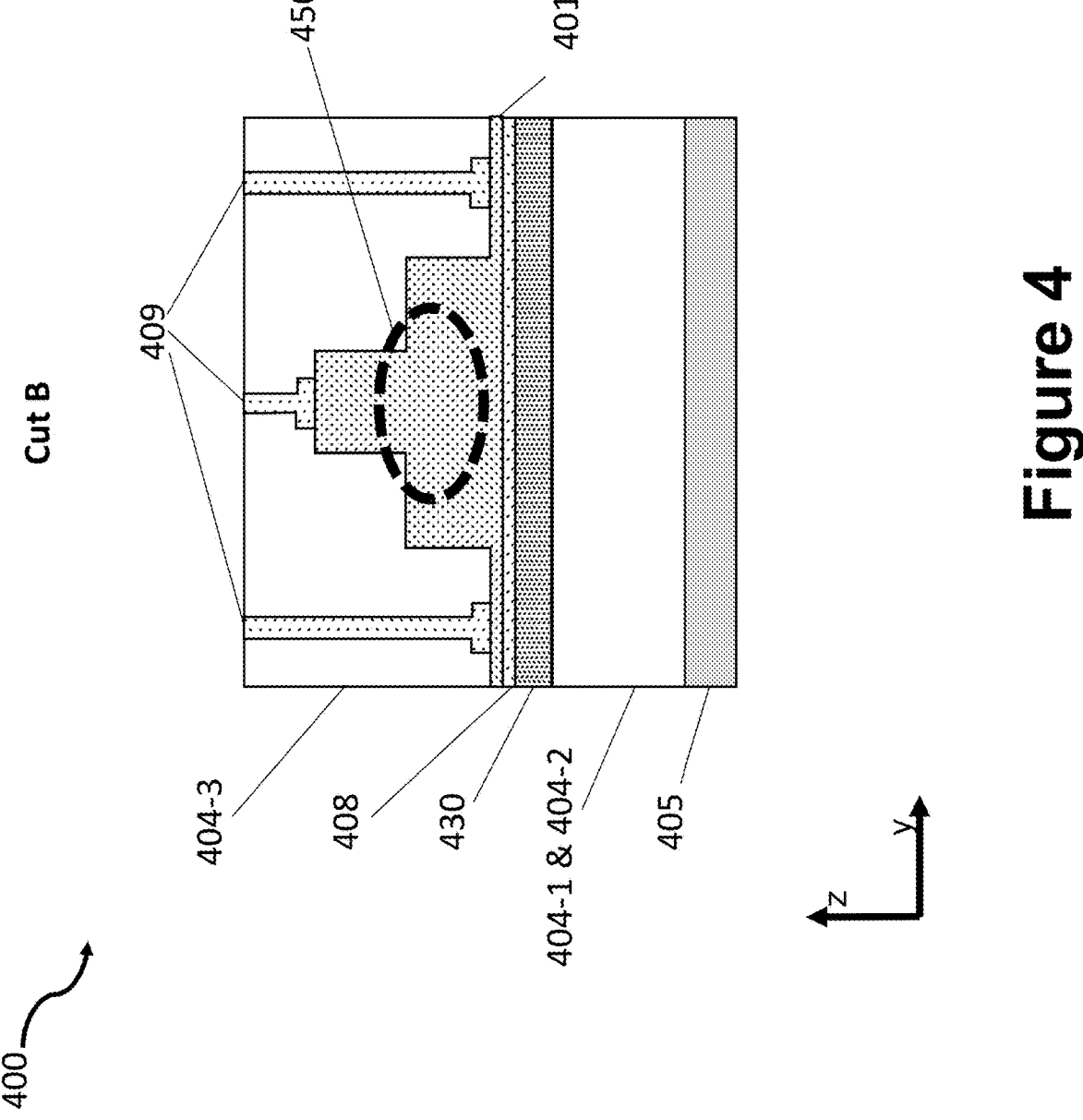
FIG. 4 shows cross-sectional end-on view of a device according to some embodiments of the present invention.

FIG. 4 and view 400 show a cross-sectional end-on view corresponding to the characteristic location marked B in FIG. 1. Functional layers 401 to 430 (unless explicitly defined differently) correspond to functional layers 201 to 230 as described in relation to FIG. 2. The cross-section 400 shows an illustrative cut through a region that comprises active layer 401 and heatsink 430. Layer 401 comprises multiple sub-layers providing the functionality necessary to realize active devices. Such layers are realized with varying binary, ternary and quaternary compositions and various doping levels as is known in the art of designing III/V semiconductor optical devices to realize contact layers, active zones (quantum wells, quantum dots, pn-junction, pin-junction), claddings, graded layers, separate-confinement heterostructure layers, bandgap smoothing layers, etch stop layers and/or others. The optical mode 450 is laterally (y-axis) confined by at least one etch (two are shown in FIG. 4), while vertical confinement utilizes refractive index difference between the sublayers of layer 401 and, in some embodiments, claddings realized by at least one of the layers 430, 408, 404-1, and 404-2. In some embodiments, an additional material (not shown, but an extended portion of layer 202-2, 302, 204-2 and 304-2) may also be present embedded within layer 430, acting as an "anti-dishing" component as well as cladding, as will be explained below with the help of FIG. 9.

The vertical position and height of the mode is defined by the sublayers of layer 401, and also by cladding as described earlier. Due to the ability to place the center of the mode at a distance from the bottom surface (z-direction) of layer 401, and due to the large refractive index difference between layer 401 and bottom cladding layers (e.g. layers 430, 408, 404-1, and 404-2), the optical mode 450 has very little overlap with layer 430. This enables us to place materials within layer 430 that can have high optical loss, but with minimal impact on the modal loss for the optical mode 450. The thickness (z-direction) and composition of optional spacer layer 408 can further be used to reduce the modal loss due to material loss of layer 430. In some embodiments the target thickness is typically in the range of 10 nm to several hundreds of nm, with actual thickness, due to process non-uniformities, being between zero and several hundreds of nanometers larger than the target thickness. In some other embodiments the thickness of 408 can be larger and approach 1000 nm. The proximity of the heatsink made from layer 430 to the active region, where the majority of heat is generated, significantly improves the thermal performance as will be shown with simulations in FIGS. 5 and 6. One or more contacts 409 allow electrical control of the active device.

Figure 5:
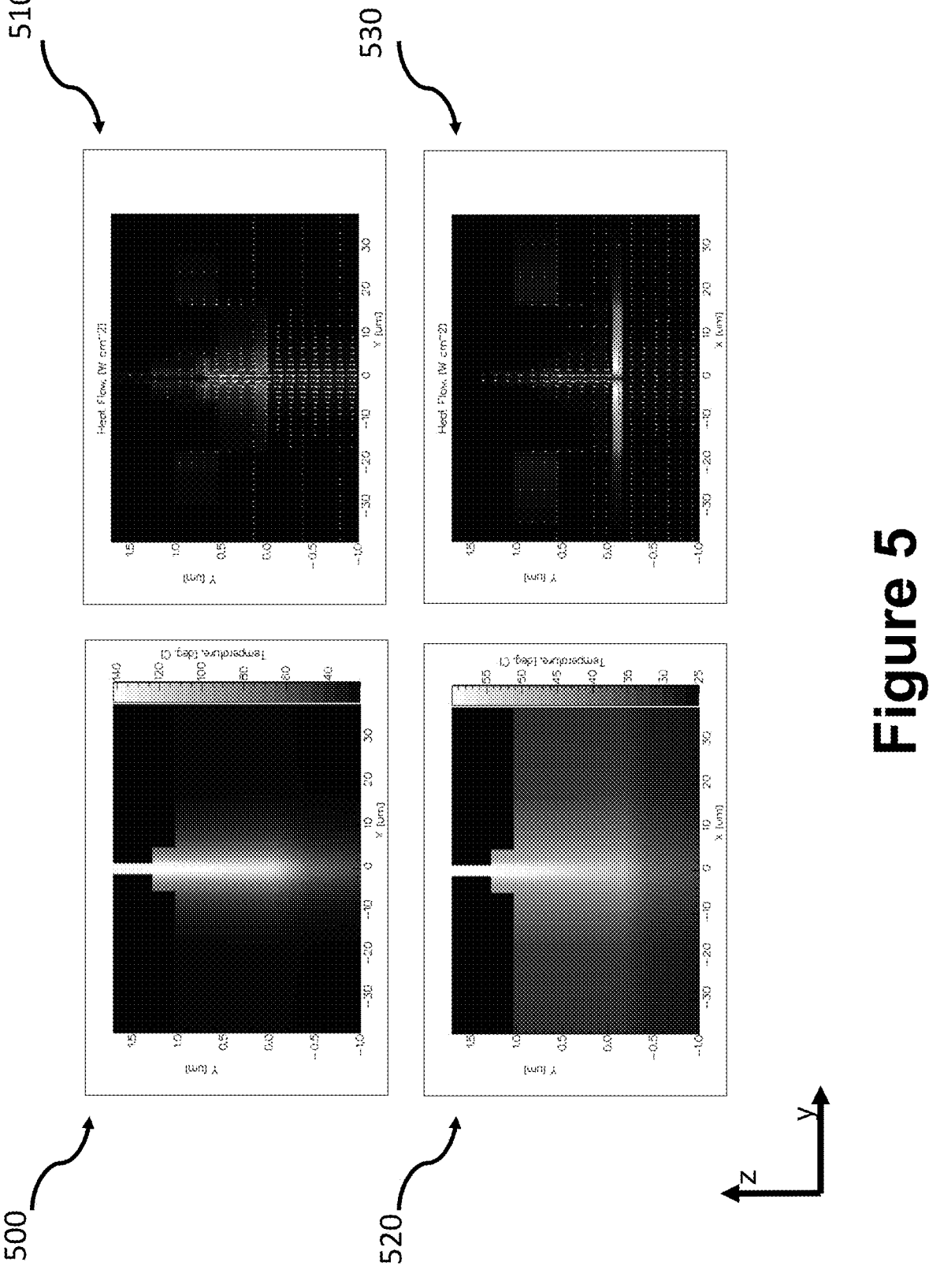
FIG. 5 shows illustrative simulation results for devices according to some embodiments of the present invention.

FIG. 5 shows some illustrative simulation results of the temperature and heat flow through the laser cross-section at location "B" (as described with the help of FIG. 4) for one case where there is no heatsink (views 500 and 510), and another case when there is a heatsink present (views 520 and 530). In this latter case the heatsink is made from a 100 nm thick copper layer, while the stage temperature (corresponding to the bottom of each plot) is set at same temperature of 25° C. The temperature inside the laser cavity (the junction temperature) is significantly reduced from around 140° C. (view 500) to only around 60° C. (view 520) as shown in left column plots. The right column shows the heat flow, and view 530 clearly shows efficient heatsinking through the heatsink compared to view 510 in which there is no deliberately introduced heat sinking element.

Figure 6:
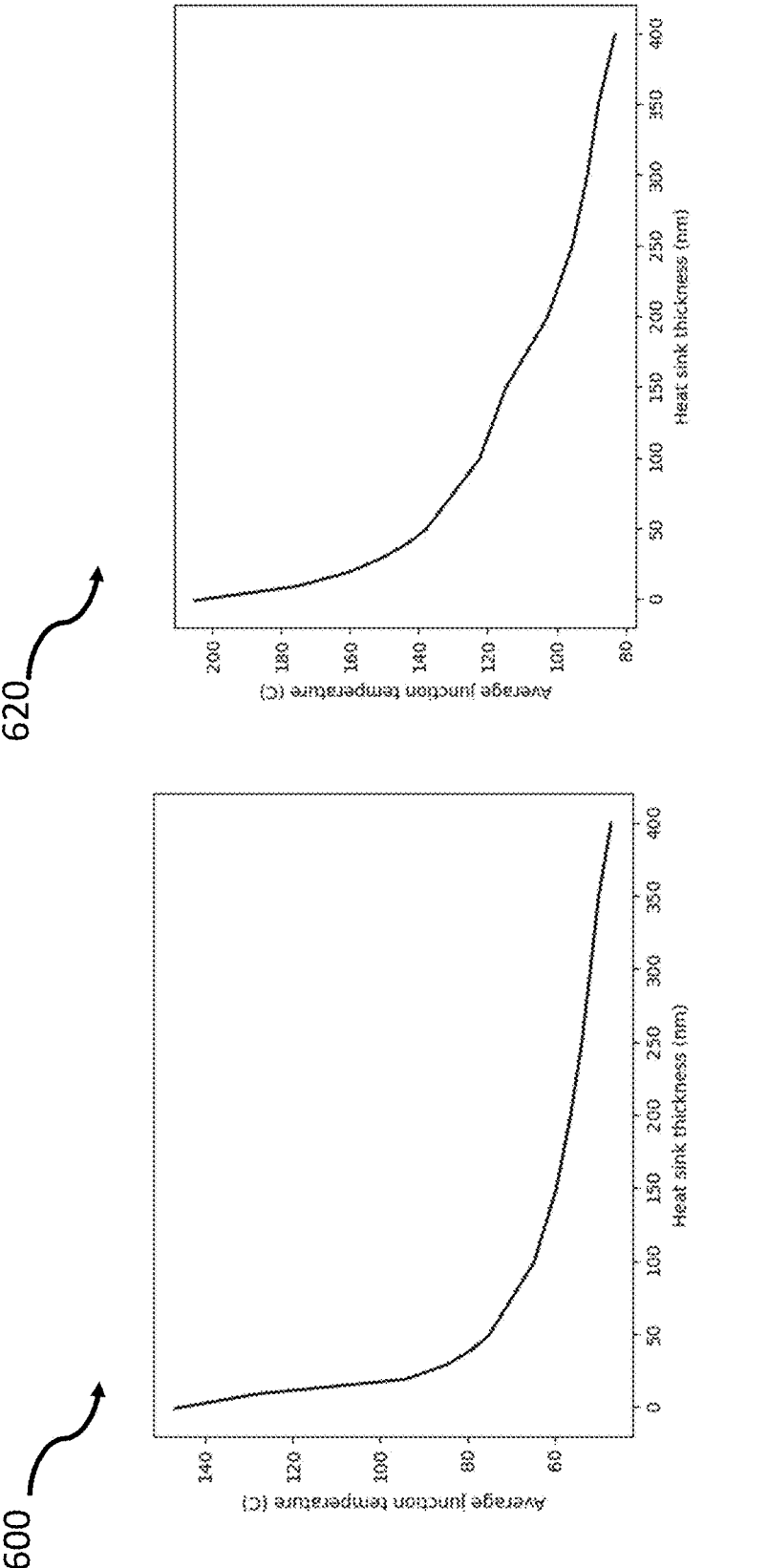
FIG. 6 shows illustrative simulation results for a device according to some embodiments of the present invention.

FIG. 6 shows illustrative simulations of the average temperature of the laser cavity (junction temperature) as a function of the heatsink thickness for two thicknesses of the bottom cladding (e.g., 204-1 and 204-2 as described with the help of FIG. 2). View 600 shows the embodiment when the bottom cladding thickness is 1.5 μm thick and view 620 shows the embodiment when the bottom cladding thickness is 15 μm thick. We can clearly see that the effect is very significant even with relatively thin layers of heat sink, as a thickness of just 100 μm reduces the temperature from around 140° C. to 70° C. for the 1.5 μm bottom cladding case, and from 200° C. to 100° C. for the 15 μm bottom cladding case. Thermal performance is further improved as the thickness of the heat sink is increased, but the effect is less pronounced. With a heat sink thickness approaching 400 nm, the junction temperature can be reduced to about 70° C. for the thicker bottom cladding case, or 40° C. for the thinner bottom cladding case (for this particular simulation). It is clear that even a reasonably thin heat sink can significantly improve the thermal conditions at the junction, with lower temperatures resulting in higher wall plug efficiency, higher output powers and a higher catastrophic optical damage threshold of the active device.

Figure 7:
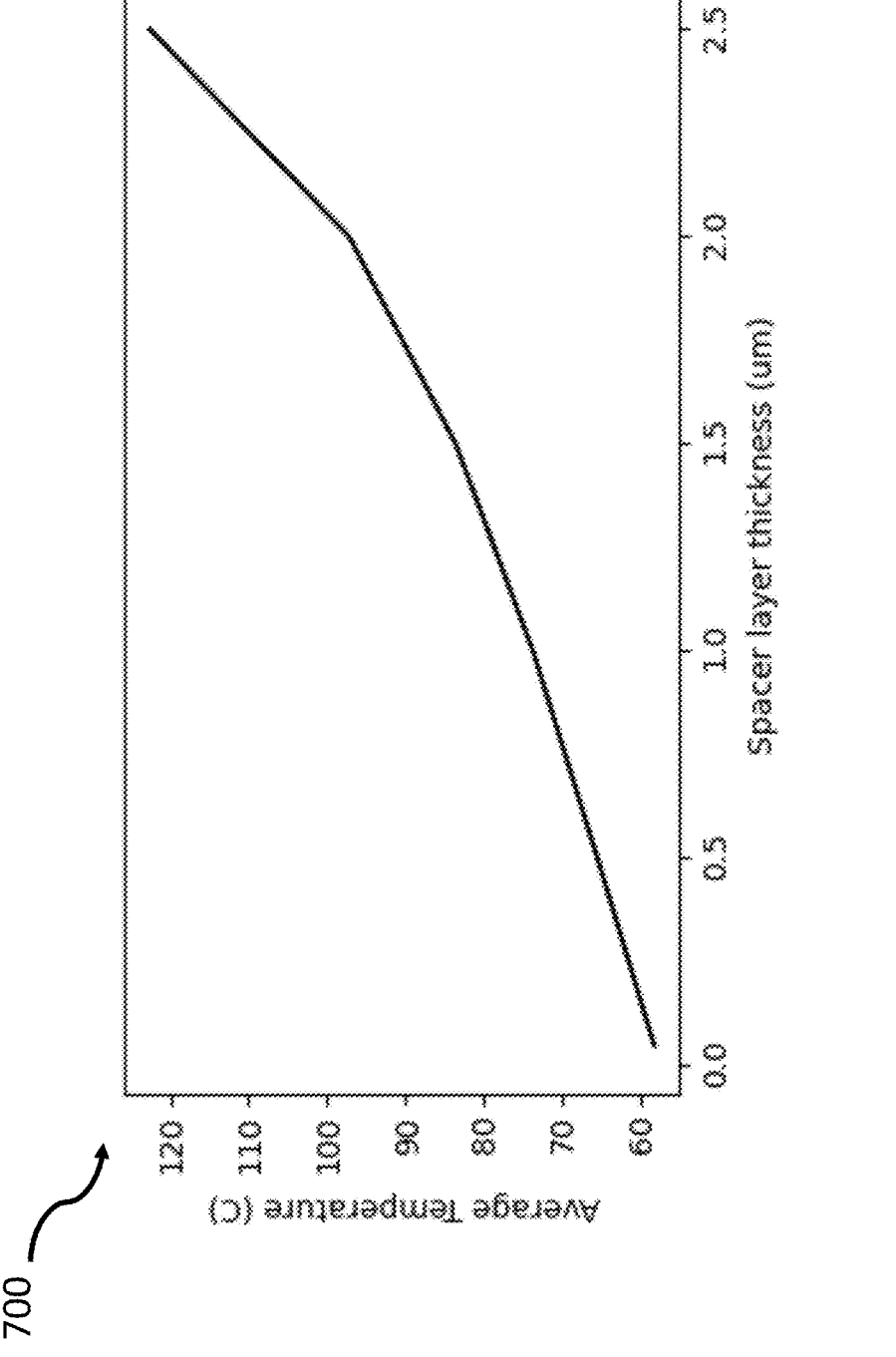
FIG. 7 shows illustrative simulation result for a device according to some embodiments of the present invention.

FIG. 7 and view 700 shows an illustrative simulation for the average temperature of the laser cavity (the junction temperature) as a function of the thickness of the spacer layer (corresponding to e.g., layer 208 in FIG. 2). The thickness of the spacer layer has an approximately exponential effect on the modal loss (as the evanescent field decays approximately exponentially), but it has a much smaller effect on the thermal performance and an almost linear effect for thicknesses less than 1000 nm, allowing for a large optimization space in which good thermal performance can be achieved.

Figure 8:
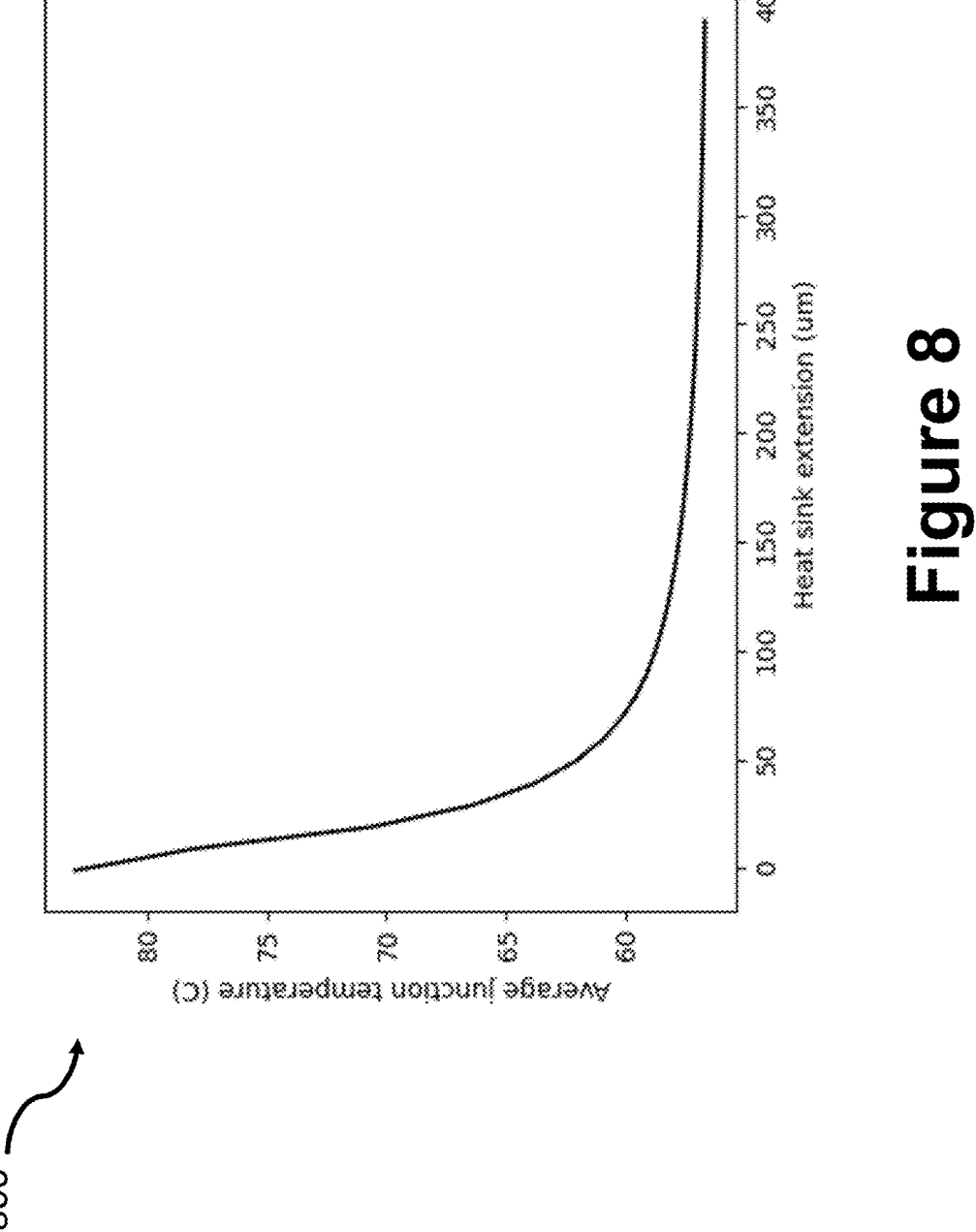
FIG. 8 shows illustrative simulation result for a device according to some embodiments of the present invention.

FIG. 8 and view 800 shows an illustrative simulation for the average temperature of the laser cavity (the junction temperature) as a function of the heat sink extension underneath the laser and extending beyond its lateral footprint. The extension would, in e.g., the case of view 100 of FIG.

1, be extension of the heat sink in the y-direction making it wider than the active element. Making the area and volume of heat sink larger leads to a significant decrease of laser cavity temperature.

Figure 9:
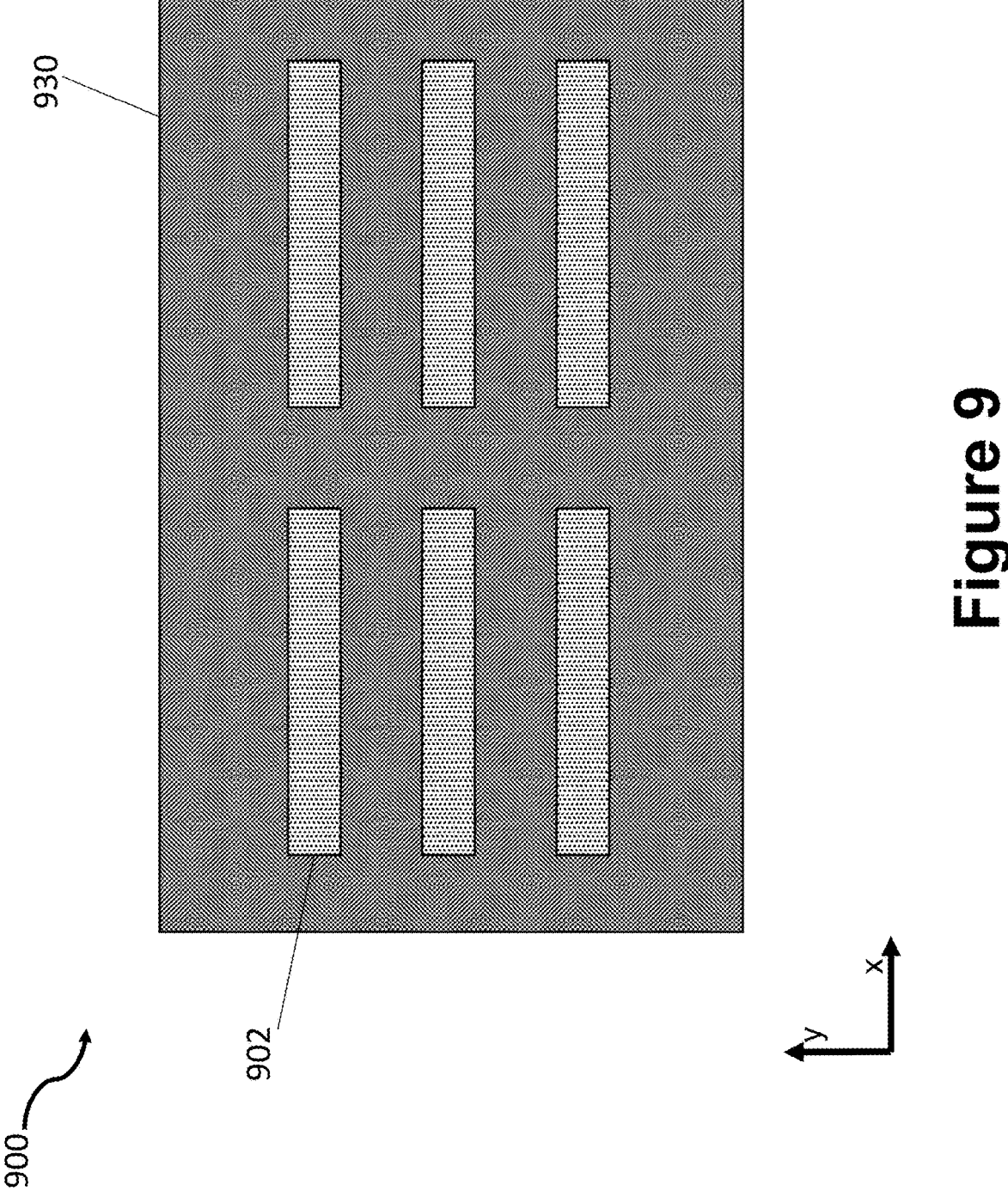
FIG. 9 shows a cross-sectional top-down view of a device according to some embodiments of the present invention.

FIG. 9 depicts a top-down cross-sectional view 900 of one embodiment of a heatsink 930. In this embodiment, there are regions inside the heatsink comprising layer 902, where layer 902 in some embodiments corresponds to the additional material from layer 202-2 mentioned above in discussing FIG. 2 and/or to layer 302 as described in relation to FIG. 3. In other embodiments, layer 902 corresponds to additional material from layer 204-2 and 304-2 as mentioned above in discussing FIG. 4. The primary purpose of introducing layer 902 into the etched pocket prepared for heatsink 930 is to improve the uniformity of the planarization process of the top surface of heatsink 930 using e.g., chemical-mechanical polishing (CMP), to avoid "dishing" as mentioned above. Various patterns can be designed to improve this uniformity as is known in the art of CMP or other planarization techniques, though a simple array of rectangular areas is shown.

It is to be understood that these illustrative embodiments teach just some examples of heterogeneously integrated lasers and active components utilizing the present invention, and many other, similar arrangements can be envisioned. Furthermore, such lasers and active components can be combined with multiple other components to provide additional functionality or better performance such as various filtering elements, amplifiers, monitor photodiodes, modulators and/or other photonic components.

Embodiments of the present invention offer many benefits. The integration platform enables scalable manufacturing of PICs made from multiple materials providing higher-performance and/or ability to operate in broadband wavelength range. Furthermore, the platform is capable of handling high optical power compared to typical Si waveguide-based or InP waveguide-based PICs.

This present invention utilizes a process flow consisting typically of wafer-bonding of a piece of compound semiconductor material on a carrier wafer with dielectric waveguides (as is described with the help of FIG. 2) and subsequent semiconductor fabrication processes as is known in the art. It enables an accurate definition of optical alignment between active and passive waveguides typically via a lithography step, removing the need for precise physical alignment. Said lithography-based alignment allows for scalable manufacturing using wafer scale techniques.

It is to be understood that optical coupling between modes in active and passive layers is reciprocal, so that, taking FIG. 2 as example, the structure can be configured to facilitate light transmission from region 201 to region 202-1, but it could also facilitate transmission in the reverse direction, from region 202-1 to region 201. It is to be understood that multiple such transitions with no limitation in their number or orientation can be realized on a suitably configured PIC.

Other approaches have relied on die attachment of pre-fabricated optical active devices to passive waveguides. This requires very stringent alignment accuracy which is typically beyond what a typical die-bonder can provide. This aspect limits the throughput of this process as well as the performance of optical coupling.

Embodiments of the optical devices described herein may be incorporated into various other devices and systems including, but not limited to, various computing and/or consumer electronic devices/appliances, communication systems, medical devices, sensors, and sensing systems.

It is to be understood that the disclosure teaches just few examples of the illustrative embodiment and that many variations of the invention can easily be devised by those skilled in the art after reading this disclosure and that the scope of the present invention is to be determined by the following claims.

The invention claimed is:

1. A device comprising:

first, second, third, fourth and fifth layers fabricated on a common substrate;

wherein the first layer comprises an active waveguide structure, having a first layer waveguide core supporting a first optical mode, the second layer comprises a passive waveguide structure having a second layer waveguide core positioned at a second vertical distance from the substrate and supporting a second optical mode, the third layer comprises a passive waveguide structure having a third layer waveguide core, positioned at a third vertical distance from the substrate where the third vertical distance is smaller than the second vertical distance, supporting a third optical mode, the fourth layer comprises a heatsink thermally coupled to the first layer, and the fifth layer, having a fifth layer waveguide core with a first end surface, perpendicular to an optical axis of the fifth layer, at least partly butt-coupled to an end surface of the first layer waveguide core, and a second end surface, perpendicular to the optical axis of the fifth layer, that is but not butt-coupled to the second layer waveguide core, comprises an intermediate waveguide structure, the fifth waveguide core supporting an intermediate optical mode, different from the first optical mode;

wherein an effective mode area characterizing the third optical mode, at an axial position where the third waveguide core does not underlie any position of the second waveguide core, is larger than an effective mode area characterizing the second optical mode, at an axial position where the second waveguide core does not underlie any position of the fifth layer; and wherein a tapered waveguide structure in at least one of the second and fifth layers facilitates efficient adiabatic transformation between the second optical mode and the intermediate optical mode;

wherein a tapered waveguide structure in at least one of the second and third layers facilitates efficient adiabatic transformation between the second optical mode and the third optical mode;

wherein each of the second layer waveguide core and the third layer waveguide core comprises at least one of silicon nitride, silicon-oxynitride, titanium dioxide, tantalum-pentoxide, doped silicon-dioxide, lithium-niobate, and alumina; and wherein no adiabatic transformation occurs between the intermediate optical mode and the first optical mode.

2. The device of claim 1, wherein the heatsink comprises at least one of silicon, silicon-nitride, copper, gold, aluminum, tungsten, silver, zinc, diamond, graphite, silicon-carbide, and aluminum-nitride.

3. The device of claim 2, wherein the heatsink is between 25 nm and 400 nm thick.

4. The device of claim 2, wherein the heatsink further comprises at least one of silicon nitride, silicon-oxynitride, titanium dioxide, tantalum-pentoxide, doped silicon-dioxide, lithium-niobate, and alumina for more uniform planarization of the top surface.

5. The device of claim 1, wherein the first and fourth layers are separated by a spacer with thickness >10 nm.

6. The device of claim 1, wherein the third layer waveguide core thickness is between 20 nm and 200 nm, and second layer waveguide core thickness is between 150 nm and 600 nm.

7. The device of claim 1, wherein the device is designed to be operational for light of wavelength L; and wherein the effective mode area characterizing the third optical mode is larger than $L^2$.

8. A device comprising:

first, second, third, and fourth layers fabricated on a common substrate;

wherein the first layer comprises an active waveguide structure, having a first layer waveguide core supporting a first optical mode, the second layer comprises a second passive waveguide structure having a second passive waveguide core, characterized by a second thickness, supporting a second optical mode and a third passive waveguide structure having a third passive waveguide core, characterized by a third thickness where the third thickness is smaller than the second thickness, supporting a third optical mode, the third layer comprises a heatsink thermally coupled to the first element, and the fourth layer, having a fourth layer waveguide core with a first end surface, perpendicular to an optical axis of the fourth layer, at least partly butt-coupled to an end surface of the first layer waveguide core, and a second end surface, perpendicular to the optical axis of the fourth layer, that is not butt-coupled to the second layer waveguide core, comprises an intermediate waveguide structure, the fourth waveguide core supporting an intermediate optical mode, different from the first optical mode;

wherein a tapered waveguide structure in at least one of the second and fourth layers facilitate efficient adiabatic transformation between the second optical mode and the intermediate optical mode;

wherein a shallow etched tapered structure in at least part of the second layer facilitates efficient adiabatic transformation between the second optical mode and the third optical mode;

wherein an effective mode area characterizing the third optical mode, at an axial position where the third waveguide core does not underlie any position of the second waveguide core, is larger than an effective mode area characterizing the second optical mode, at an axial position where the second waveguide core does not underlie any position of the fourth layer;

wherein each of the first passive waveguide core and the second passive waveguide core comprises at least one of silicon nitride, silicon-oxynitride, titanium dioxide, tantalum-pentoxide, doped silicon-dioxide, lithium-niobate, and alumina; and wherein no adiabatic transformation occurs between the intermediate optical mode and the first optical mode.

9. The device of claim 8, wherein the heatsink comprises at least one of silicon, silicon-nitride, copper, gold, aluminum, tungsten, silver, zinc, diamond, graphite, silicon-carbide, aluminum-nitride.

10. The device of claim 9, wherein the heatsink area additionally comprises at least one of silicon nitride, silicon-oxynitride, titanium dioxide, tantalum pentoxide, doped silicon-dioxide, lithium-niobate, and alumina for more uniform planarization of the top surface.

11. The device of claim 8, wherein the first and third layers are separated by a spacer with thickness >10 nm.

12. The device of claim 8, wherein the thickness of the heatsink is between 25 nm and 400 nm.

13. The device of claim 8, wherein a thickness characterizing the second passive waveguide core is between 20 nm and 200 nm, and a thickness characterizing the first passive waveguide core is between 150 nm and 600 nm.

14. The device of claim 8, wherein the device is designed to be operational for light of wavelength L; and wherein the effective mode area characterizing the third optical mode is larger than $L^2$.

15. The device of claim 8, wherein the second layer comprises an etch stop layer.

* * * * *